United States Patent
Enrione Caceres et al.

(10) Patent No.: US 9,763,463 B2
(45) Date of Patent: Sep. 19, 2017

(54) METHOD FOR THE FORMULATION OF A GEL-FORMAT FOODSTUFF FOR USE AS A NUTRITIONAL FOODSTUFF ENRICHED WITH PEPTIDES AND MALTODEXTRINS OBTAINED FROM QUINOA FLOUR

(71) Applicant: Universidad de Santiago de Chile, Santiago (CL)

(72) Inventors: Javier Ignacio Enrione Caceres, Santiago (CL); Paulo Diaz Calderon, Santiago (CL); Fernando Osorio Lira, Santiago (CL)

( * ) Notice: Subject to any disclaimer, the term of this patent is extended or adjusted under 35 U.S.C. 154(b) by 0 days.

(21) Appl. No.: 14/312,465

(22) Filed: Jun. 23, 2014

(65) Prior Publication Data

US 2014/0302198 A1 Oct. 9, 2014

Related U.S. Application Data

(63) Continuation of application No. PCT/CL2012/000073, filed on Dec. 13, 2012.

(51) Int. Cl.

| | |
|---|---|
| *A61K 8/02* | (2006.01) |
| *A23J 1/12* | (2006.01) |
| *A23L 29/212* | (2016.01) |
| *A23L 29/30* | (2016.01) |
| *A23L 33/00* | (2016.01) |
| *A23L 33/18* | (2016.01) |
| *A23L 2/66* | (2006.01) |

(52) U.S. Cl.
CPC .............. *A23J 1/12* (2013.01); *A23L 29/212* (2016.08); *A23L 29/35* (2016.08); *A23L 33/18* (2016.08); *A23L 33/40* (2016.08); *A23V 2002/00* (2013.01)

(58) Field of Classification Search
CPC .......... A23V 2002/10; A61K 6/00; A23L 1/00; A23L 1/052
See application file for complete search history.

(56) References Cited

U.S. PATENT DOCUMENTS

| | | | | |
|---|---|---|---|---|
| 5,180,669 | A * | 1/1993 | Antrim | ................... C12P 19/14 435/100 |
| 2004/0081708 | A1* | 4/2004 | Baxter | ......................... 424/722 |
| 2007/0092629 | A1 | 4/2007 | Scanlin et al. | |
| 2010/0136144 | A1 | 6/2010 | Msika | |
| 2010/0184963 | A1* | 7/2010 | Scanlin | .................. A21D 2/165 530/412 |

FOREIGN PATENT DOCUMENTS

| | | |
|---|---|---|
| EP | 2098124 A1 | 9/2009 |
| WO | 2007-084754 A2 | 7/2007 |

OTHER PUBLICATIONS

Araujo-Farro, et al., Development of films based on quinoa (Chenopodium quinoa, Willdenow) starch, vol. 81, Issue 4, Jul. 2010, p. 839-848.*

Aluko, R.E. et al., "Functional and Bioactive Properties of Quinoa Seed Protein Hydrolysates", Jrl. of Food Science, vol. 68, No. 4, pp. 1254-1258 (2003).

Takao, T. et al., "Hypocholesterolemic Effect of Protein Isolated from Quinoa (Chenopodium quinoa Willd.) Seeds", Food Sci. Technol., 11 (2), pp. 161-167 (2005).

* cited by examiner

*Primary Examiner* — D. Lawrence Tarazano
*Assistant Examiner* — Philip Dubois
(74) *Attorney, Agent, or Firm* — Bryan D. Zerhusen; Locke Lord LLP (57) ABSTRACT

Disclosed is a process to extract peptides and maltodextrins from quinoa flour for the manufacturing of foodstuff corresponding to a gel for sportspeople consumption during and after physical activity.

8 Claims, 9 Drawing Sheets

Final Equation in Terms of Actual Factors:

Extracted Protein =
+56.30332
-1.00411    * Extraction Volume
-0.56114    * NaOH Concentration
-32.07583   * Time
+0.032417   * Extraction Volume * NaOH Concentration
+1.98926    * Extraction Volume * Time
+0.50806    * NaOH Concentration * Time
-0.026919   * Extraction Volume * NaOH Concentration*Time

METHOD FOR THE FORMULATION OF A GEL-FORMAT FOODSTUFF FOR USE AS A NUTRITIONAL FOODSTUFF ENRICHED WITH PEPTIDES AND MALTODEXTRINS OBTAINED FROM QUINOA FLOUR

CROSS-REFERENCE TO RELATED APPLICATIONS

This application is a continuation of International application No. PCT/CL2012/000073 filed on Dec. 13, 2012, which claims priority to Chilean Application No. 3236-2011 filed on Dec. 21, 2011, which applications are incorporated herein by reference.

TECHNICAL FIELD

The present invention relates to an extraction process of peptides and maltodextrins from *quinoa* flour in order to manufacture foodstuff in gel format for sportspeople during and after physical activity.

BACKGROUND ART

At the moment there are in the market different products developed for amateur sportspeople and/or professionals with different purposes such as increasing endurance, hydration, muscle toning, recovering, increasing muscle mass, decreasing levels of lactic acid in muscles, among others. These products are based mainly on carbohydrates and proteins along with nutrition supplements (Kreider, R, Wilborn, C, Taylor, L, Campbell, B, Almada, A, Collins, R, Cooke, M, Earnest, C, Greenwood, M, Kalman, D, Kerksick, C, Kleiner, S, Leutholtz, B, Lopez, H, Lowery, L, Mendel, R, Smith, A, Spano, M, Wildman, R, Willoughby, D, Ziegenfuss, T, and Antonio, J, ISSN exercise & sport nutrition review: research & recommendations. Journal of the International Society of Sports Nutrition 7:7 (2010)).

Sport nutrition supplements are based primarily on carbohydrates and protein sources obtained from cereals such as corn and wheat, legumes such as soy, animal products such as milk or eggs, apart from adding active substances depending on the properties these products offer (i.e. caffeine, carnitine, taurine). Among the products existing today in the market for sports practitioners are drinks and energy bars.

The demand for this kind of product in the world has recently increased, due to a boost in sports culture. However, the ergogenic aid products sold today in Chile have a high cost and are mainly imported, which reveals little competition in the area, which in turn opens an interesting niche for the development and commercialization of similar products.

The kinetics of absorption of these substances in the body depends on different factors during each step of digestion, which are: i) food lubrication by body secretions, ii) mechanic reduction of carbohydrates, lipids and proteins, iii) nutrient absorption. This last process occurs in the small intestine. Once proteins have been reduced by proteases, they are absorbed as tripeptides, dipeptides and individual amino acids. Carbohydrates (sugars and starch) are hydrolyzed by endogenous enzymes in the intestine into disaccharides such as saccharose, lactose and maltose and later into monosaccharides such as glucose, fructose and galactose, which are then absorbed. Lipids are decomposed by lipase into fatty acids and monoglycerides. Generally speaking, the nutrient absorption mechanisms involved are: i) active transport, ii) passive diffusion, iii) endocytosis and iv) facilitated diffusion. Active transport is mainly used for the absorption of carbohydrate and protein constituting units, which requires energy for its correct functioning.

Therefore, all this suggests that any strategy whose purpose is to reduce complex structures in size and to cause changes in this kind of biocomposite configuration previous to ingestion, will increase the absorption kinetics of nutrients in the intestine, which through a product developed specially for sportspeople will result in the individual's faster recovery at a lower energy cost.

FIELD OF APPLICATION

We propose to formulate a gel type food product containing peptides, maltodextrins and starch extracted directly from *quinoa* grains as raw material, oriented to people who have intense physical activity, whether at work or when doing sports. *Quinoa* is a pseudocereal from the Andes with a high nutritional value, nonallergenic (Yotaro, K, Nutricional Characteristics of Pseudocereal Amaranth and *Quinoa*: Alternative Foodstuff for Patients with Food Allergy. Journal of Japanese Society of Nutrition and Food Science 55:299-302 (2002)), which possesses all essential amino acids for human consumption in higher quantities than any other cereal (Ruales, J y Nair, B, Nutritional quality of the protein in *quinoa* (*Chenopodium quinoa*, Willd) seeds. Plant Foods for Human Nutrition (Formerly *Qualitas Plantarum*) 42:1-11 (1992)). The formulation of a product that contains enzymatically hydrolysed maltodextrins and peptides from *quinoa* flour represents then a qualitative advantage over similar products available in the market, from a nutritional and functional point of view. It is important to point out that there is no foodstuff enriched with *quinoa* protein hydrolysates currently in the market, nor has it been reported. Besides, the gel format allows easy transportation and consumption by sportspeople or other users, which opens great possibilities for its consumption. Moreover, the use of *quinoa* for the production of foodstuff and/or supplements constitutes an important step forward in the use of alternative raw materials to promote the exploitation of natural resources that have not yet been considered at a large scale by the industry.

STATE OF THE ART

During physical activity muscle protein (myofibrillar proteins) breakdown occurs, where the harder the exercise, the bigger the breakdown (Crittenden, R, Buckley, J, Cameron-Smith, D, Brown, A, Thomas, K, Davey, S, y Hobman, P, Functional Dairy Protein Supplements for Elithe Athletes. Australian Journal of Dairy Technology 64:133-137 (2009) y DSM, FS. PeptoPro: Power your performance, reach beyond your limits. 2010 [cited 05-01-2011]; Available from: http://www.dsm.com/le/en_US/peptopro/html/how-doesitwork_proven.htm). Recent reports state the key role that proteins have in muscle endurance and recovery. It has been reported that endurance improves significantly if a carbohydrate and protein-based supplement is consumed when doing high intensity bicycling (Harmon, J H, Burckhard, J R, y Seifert, J G, Ingestion of a Carbohydrate-Protein Supplement Improves Performance During Repeated Bouts of High Intensity Cycling. Medicine & Science in Sports & Exercise 39:S362 10.1249/01.mss.0000274422.60488.dd (2007)). Levels of lactate and heart rate are lower in individuals who use a carbohydrate and protein-based supplement than in those who use a supplement based only on carbohydrates (Saunders, M J, Todd, M K, Valentine, R J, St.

Laurent, T G, Kane, M D, Luden, N D, and Herrick, J E, Inter-Study Examination of Physiological Variables Associated with Improved Endurance Performance with Carbohydrate/Protein Administration. Medicine & Science in Sports & Exercise 38:S113-S114 (2006), y Valentine, R J, St. Laurent, T G, Saunders, M J, Todd, M K, y Flohr, J A, Comparison of Responses to Exercise When Consuming Carbohydrate and Carbohydrate/Protein Beverages. Medicine & Science in Sports & Exercise 38:S341 (2006), while pain and muscle damage are lower among runners who used proteins during exercise (Luden, N D, Saunders, M J, Pratt, C A, Bickford, A S A, Todd, M K, y Flohr, J A, Effects of a Six-Day Carbohydrate/Protein Intervention on Muscle Damage, Soreness, and Performance In Runners. Medicine & Science in Sports & Exercise 38:S341 (2006)).

The beneficial effects of peptide or protein hydrolysates in muscle recovery have also been described, mainly of those derived from milk. Crittenden et al (Crittenden, R, Buckley, J, Cameron-Smith, D, Brown, A, Thomas, K, Davey, S, and Hobman, P, Functional Dairy Protein Supplements for Elithe Athletes. *Australian Journal of Dairy Technology* 64:133-137 (2009)) have demonstrated how a hydrolysate from milk protein can accelerate recovery in elite athletes. However, the action mechanisms or the identification of the active peptides are still a matter of research. It has also been shown how peptides from casein are effective in reducing pain and muscle damage, increasing endurance, performance and recovery before and after intense physical activity (DSM, F S. *PeptoPro: Power your performance, reach beyond your limits.* 2010 [cited 05-01-2011]; Available from: http://www.dsm.com/le/en_US/peptopro/html/howdoesitwork_proven.htm). It has been proposed as well that proteins and peptides stimulate insulin production, which in turn stimulates glycogen formation (DSM, F S. *PeptoPro: Power your performance, reach beyond your limits.* 2010 [cited 05-01-2011]; available from: http://www.dsm.com/le/en_US/peptopro/html/howdoesitwork_proven.htm). Morishita et al (Morishita, M, Kamei, N, Ehara, J, Isowa, K, and Takayama, K, A novel approach using functional peptides for efficient intestinal absorption of insulin. *Journal of Controlled Release* 118:177-184 (2007)) proved that the inclusion of commercial functional peptides increases the level of insulin absorption in the intestine of rats.

Studies have shown the increase of nutritional properties when protein sources are enzymatically hydrolyzed, increasing solubility, absorption and decreasing associated allergenic characteristics (Mannheim, A y Cheryan, M, Enzyme-Modified Proteins From Corn Gluten Meal: Preparation And Functional Properties. *J Am Oil Chem Soc.* 69:1163-1169 (1992)). On the other hand, and depending on the protein source, other properties can be enhanced, such as nutraceutical, emulsifying and bioactive properties. These properties may vary according to the protein hydrolysates composition and size (Aluko, R E y Monu, E, Functional and Bioactive Properties of *Quinoa* Seed Protein Hydrolysates. Journal of Food Science 68:1254-1258 (2003), y Qi, M, Hettiarchchy, N S, y Kalapathy, U, Solubility and Emulsifying Properties of Soy Protein Isolates Modified by Pancreatin. Journal of Food Science 62:1110-1115 (1997)).

*Quinoa* (*Chenopodium quinoa*) is a seed rich in proteins, which provide an important part of essential aminoacids to people, that is to say, those which must be consumed through diet. Its contents of essential aminoacids such as tyrosine, phenylalanine, threonine, lysine, methionine and cysteine are high compared to other vegetal food sources. Besides, these seeds have a high content of starch and fiber (>75%), hence the name pseudocereal (Ruales, J and Nair, B, Nutritional quality of the protein in *quinoa* (*Chenopodium quinoa*, Willd) seeds. Plant Foods for Human Nutrition (Formerly *Qualitas Plantarum*) 42:1-11 (1992)). *Quinoa* has a protein content that is in the range of 12 to 14 grams per 100 grams of dry seed, even though these figures may vary depending on the seed variety. On the other hand, within the total protein content there is a percentage that is insoluble and resistant to enzymatic hydrolysis (e.g. scleroproteins).

It is possible to find some scientific studies related directly or indirectly to the field of this invention. Tang et al (Tang, H, Watanabe, K, and Mitsunaga, T, Characterization of storage starches from *quinoa*, barley and adzuki seeds. *Carbohydrate Polymers* 49:13-22 (2002)) characterize the *quinoa* starch granule, and state that its size distribution is ~1 μm and that the isothermal sorption curve is sigmoidal. Water sorption properties are similar to the ones observed in barley starch. Aluko and Monu (Aluko, R E and Monu, E, Functional and Bioactive Properties of *Quinoa* Seed Protein Hydrolysates. *Journal of Food Science* 68:1254-1258 (2003)) assessed the functional properties of *quinoa* hydrolysates as food ingredients through the action of an alcalase enzyme. They concluded that the obtained protein hydrolysate presents higher solubility, lower emulsification and a higher foaming capacity than a *quinoa*-based protein concentrate. They also concluded that those peptides with a lower molecular weight have a greater potential as anti-hypertension agent or as anti-radical activity compounds. Nevertheless, that study does not describe nor assess possible and specific industrial applications.

The use of *quinoa* as a raw material for the production of special diet products has also been studied. Abugoch et al(Abugoch, L, Castro, E, Tapia, C, Añón, M C, Gajardo, P, and Villarroel, A, Stability of *quinoa* flour proteins (*Chenopodium quinoa* Willd.) during storage. *International Journal of Food Science & Technology* 44:2013-2020 (2009)) stated that *quinoa* flour (~75% carbohydrates, ~16% proteins, both on dry base) keeps its functional properties to retain water and of solubility after being stored for two months at 20 to 30° C. in a double-layer Kraft paper bag. Caperuto et al (Caperuto, L C, Amaya-Farfan, J, and Camargo, C R O, Performance of *quinoa* (*Chenopodium quinoa* Willd) flour in the manufacture of gluten-free spaghetti. *Journal of the Science of Food and Agriculture* 81:95-101 (2001)) formulated a mixture of *quinoa* flour and corn to manufacture gluten-free spaghetti, having obtained a loss of weight, an increase in volume and in stickiness of the cooked pasta within acceptable parameters. Besides, the product was sensory appealing to consumers. Moreover, the benefits of *quinoa* consumption from a nutritional and functional point of view have been reported, as well as some negative aspects related to its high levels of saponins, phytic acid and oxalate (Jacobsen, S E, Mujica, A, and Ortiz, R, The Global Potential for *Quinoa* and Other Andean Crops. Food Reviews International 19:139-148 (2003), y Jancurová, M, Minarovicová, L, y Dandár, A, *Quinoa*—A Review. Czech Journal of Food Science 27:71-79 (2009)), which taste bitter and are associated to a certain level of toxicity. However, in those studies there is no reference to the potential use of proteins, peptides, starch or maltodextrins extracted from *quinoa* grains.

A number of related studies can also been found regarding the use of peptides from other sources. Sinha et al (Sinha, R, Radha, C, Prakash, J, and Kaul, P, Whey protein hydrolysate: Functional properties, nutritional quality and utilization in beverage formulation. Food Chemistry 101:1484-1491 (2007)) studied the application of a hydrolysate from whey protein obtained by the use of microbial proteases in the formulation of a beverage. From the sensorial point of view, no significant differences were found between the formulated product and a commercial sample. Barbosa et al (Barbosa, C M S, Morais, H A, Delvivo, F M, Mansur, H S, De Oliveira, M C, and Silvestre, M P C, Papain hydrolysates of casein: molecular weight profile and encapsulation in liposphenes. *Journal of the Science of Food and Agriculture* 84:1891-1900 (2004)) obtained casein hydrolysates through the action of papain, that are less bitter and more stable during 60 days of refrigerated storage when encapsulated.

Meanwhile, Hartmann and Meisel (Hartmann, R and Meisel, H, Food-derived peptides with biological activity: from research to food applications. *Current Opinion in Biotechnology* 18:163-169 (2007)) have described the antimicrobial, immunoregulatory, antithrombotic, blood pressure regulating, antioxidant and hypocholesterolemic characteristics—among others—of peptides from different sources (mainly milk proteins, as well as from fish, whey, soy and rice) and their potential use in the food industry. Takao et al (Takao, T, Watanabe, N, Yuhara, K, Itoh, S, Suda, S, Tsuruoka, Y, Nakatsugawa, K, and Konishi, Y, Hypocholesterolemic effect of protein isolated from *Quinoa (Chenopodium quinoa* Willd.) seeds. *Food Science and Technology Research* 11:161-167 (2005)) described the hypocholesterolemic effect observed in rats fed with a *quinoa* isolated protein diet in different percentages.

In the database of various patent offices, in Chile or international, patent requests or granted patents in similar areas can be found, but they do not alter the novelty or inventiveness of the present invention.

In the Chilean National Institute for Intellectual Property (Instituto Nacional de Propiedad Intelectual, INAPI), there are no patent requests relating directly to the application field of this invention. With respect to *quinoa*, San Martin (San Martin Gamboa, R, Métodos para producir una composición líquida y en polvo en base a saponinas obtenidas de cascarilla de *quínoa*; composiciones obtenidas de este método; y método para controlar caracoles de agua dulce con dicha composición, R. San Martin Gamboa, Editor. 2005: Chile, y San Martin Gamboa, R, Composición en base a saponinas obtenidas de extracto acuoso de *quínoa*, útil como repelente de caracoles terrestres y molusquicida, R. San Martin Gamboa, Editor. 2005: Chile) and Reyes (Reyes Ruiz, M E, Composición orgánica que actúa como repelente inhibidor de la alimentación y contacto directo sobre plagas e insectos, regulador del crecimiento vegetal, fungicida, nematicida y antioxidante natural que comprende *Chenopodium Quinoa*, esencia de eucaliptus y de *Azadirachita indica*, R.E.I.C.B.L.M.E.R.R. (60%), Editor. 2008: Chile) have entered requests to obtain saponins from the aqueous extract of *quinoa* seeds to be used as an insect repellent. With respect to protein hydrolysates, Reid et al (Reid, J, Scghollum, L, Schlothauer, R, and Singh A, Procedimiento de preparación hidrolizado de proteínas del suero de la leche que consiste en tratar el suero con proteasas lábiles al calor y detener la hidrólisis al alcanzar no más de un 15% de hidrólisis; separar los repetidos hidrolizados, los péptidos y su use para preparar un medicamento que reduce la presión sistólica, N.Z.D. Board, Editor. 1999: Chile) described a means by which a protein hydrolysate can be obtained from whey and be used to manufacture a medicament that may reduce systolic pressure. There are also other requests related to the use of peptides: Ramírez (Ramirez Reid, R, Procedimiento de producción de soluciones húmedas de péptidos al 50% de concentración péptidos secos para alimentación humana y animal desde productos secundarios de producción de alimentos proteicos para consumo humano que comprende extraer grasa a baja temperatura previo a acción enzimática, combinando acción enzimática con hidrólisis acida I.R. Ltda., Editor. 2009: Chile) is seeking to use peptides from food production byproducts in human and animal feeding, while Milián et al (Millan Alvarado, M T, Lecaros Ursua, I, Neira Laso, M, and Valderrama Campos G, Peptidos bioactivos a partir de proteínas de origen marino; proceso de fabricación de dichos peptidos bioactivos; y su use para elaborar dietas de animales, S. A. Profish, Editor. 2008: Chile) are seeking to use sea protein peptides for animal feeding. Both requests are to date in evaluation stage. Finally, there's an abandoned request presented by Unilever N. V. that seeks to include peptides in the formula of a food bar (Gautam, A, García, A, y Hander, R, Barra alimenticia, que comprende al menos un 10% basado en el peso total de los péptidos de la barra, de péptidos con una alta actividad de agua, U.N.V., Editor. 2005: Chile).

In the US Patent & Trademark Office, USPTO and the European Patent Office, EPO databases it is possible to find related patent requests, many of which have been granted for both markets. In the USPTO database there are requests relating *quinoa*, but not directly relating the use of protein peptides as food ingredients. In 2007 Edwards (Edwards, M, *Quinoa-containing beverages and methods of manufacture.* 2007: USA) entered a request describing a process to grind whole *quinoa* grains and their use in the manufacture of beverages which has also been requested to the EPO. The corresponding claims inform about the conditions in which the grinding must occur and its mixing with a based liquid fraction. Three requests concerning *quinoa* can be found in 2010 Msika (Msika, P, *Composition containing a quinoa extract for dermatological use.* 2010, Laboratories Expanscience: USA.) describes the use of *quinoa* protein peptides enzimatically obtained by alkaline protease action. The peptides are then isolated using ultra and nanofiltering methods. They are used for dermatological purposes. García and Stoltz (García, C and Stoltz, C, Use Of *Quinoa* Extract As Cosmetic And Pharmaceutic Slimming Agent And/Or As An Agent Preventing The Formation Of New Fats In The Human Body. 2010, Societe D'Exploitation Des Produits Pour Les Indus tries Chimiques Seppic: Francia) describe how to use a dry commercial *quinoa* extract with pharmaceutical and cosmetic purposes. They state that the dry extract is to be commercialized by being solubilized in solvents such as glycol, propylene glycol, butylene or ethanol in a maximum concentration of 2 wt %. In another study Scalin, Stone and Burnett (Scanlin, L A, Stone, M B, and Burnett, C, Qunioa Protein Concentrate, Production and Functionality. 2010, Keen Ingredients, INC: USA.) describe how to obtain a *quinoa* protein concentrate and its functionality as an ingredient, in children food, pet food and food supplements for animals. This request describes how starch, oil and fiber can be obtained from *quinoa* grains. The use of a *quinoa* concentrate is based—according to the researchers—on the high levels of lysine, histidine, methionine and cystine aminoacids which along with *quinoa* grain low allergenic levels, makes it ideal for its use in the aforementioned products. The claims state that *quinoa* proteins are obtained through isolectric precipitation followed by ultrafiltering process, and then isolated from fiber through centrifugation. Starch is obtained through amylase enzymatic action followed by vacuum filtration. These three requests have also been entered in Mexico, China, and the Patent Cooperation Treaty (PCT) under codes MX2009007088, CN101516450 y WO2005058249, respectively.

Scarlin and Burnett (Scanlin, L A y Burnett, C, *Quinoa* grain processing and products. 2010, Keen ingredients, INC:

USA) recently described how from *quinoa* grains and by means of a humidification and drying pretreatment they obtained a product to be used as food additive. The researchers detailed a "malting" mechanism in order to obtain a sweeter grain, in which the grain is germinated during 72 hours at 15° C. reaching a ~45% grain humidity. That way a sweeter grain can be obtained due to endogen enzymatic action. This request has been labeled WO2009048938 available in the EPO database.

Requests prior to the aforementioned ones by the same researches can also be found in both organizations' search engines, but they contain limited claims.

Concerning patent requests in Spain at the Oficina Española de Patentes y Marcas (Spanish Patent and Trademark Office), Remi (Remi, T, Proceso de tratamiento de semillas de *quinoa* y producto obtenido. 1996, Societe des Produits NESTLE S.A.: Suiza) describes a procedure to obtain an expanded *quinoa*-based product which has also been requested in EPO under code EP0515706. Claims state that the conditions under which *quinoa* grains are humidified to a humidity content of up to 85 wt %, after which the grains are taken to different (non-stated) temperature and humidity conditions that cause their expansion. There is also a 2003 granted patent that describes a liquid containing *quinoa* extract—saponins and maltodextrins-free flour, specifically—that along with some other raw material can be used as a milk substitute (Guamis Lopez, B, Quevedo Terri, J M, Trujillo Mesa, A J, y Felipe Cuyas, X, Producto líquido de origen vegetal como sustitutivo de la lecha 2003, Universitat Autonoma de Barcelona. España). This patent contains a claim where it was stated that maltodextrins are obtained by action of a mixture of alpha amylases of different optimum temperature of starch hydrolysis. Other requests granted in 2010 describe the manufacturing of a bakery product that contains, among other things, 30 to 85% *quinoa* derivates, mainly proteins (Carballo Macia, L y Lopez Agreda, H J V, *Producto alimenticio panificabie rico en proteína vegetal*. 2010, Health's Larder S.L.N.E.: España), as well as another request that describes the use of *quinoa* flour to elaborate pastas that contains between 50 and 90% *quinoa* derivates (Carballo Macia, L y Lopez Agreda, H J V, *Pasta alimenticia o similar rica en proteína vegetal, sin gluten ni aditivos*. 2010, Health'S Larder S.L.N.E.: España). Finally, Yaez and Muoz (Yaez Soler, A J and Muoz Cerda, A, Composición a base de cacao y espirulina. 2010, Yaez Soler, Armando José Muoz Cerda, Antonio: España) were granted a patent in 2010 for an invention described as a cocoa and spirulina composition that along with other ingredients, includes *quinoa*. The final result can be presented as a bar, candy, stuffed chocolate or a beverage. This invention may contain *quinoa* up to a 55% weight of the final product, but it does not specify if the grain is whole, ground or fragmented. The claims do not include enough information, since they only report that one of the cereal ingredients is *quinoa*. Additionally, a patent request relating to the elaboration of a formula for children is described (Mower, T E, *Infant Formula Composition*. 2006, Starweather & Associates: USA.). This formula includes a sulfated polysaccharide (fucoidan), partially hydrolyzed, a lipid and *quinoa* protein. The request was entered in the US Patent & Trademark Office in 2006. This invention (description and claims) does not specify the protein characteristics; it only states that it comes from *quinoa*.

SUMMARY

One aspect of the present invention provides a process for preparing foodstuff in gel format from *quinoa* starch and enriched with peptides and maltodextrins, wherein *quinoa* starch is turned into gel and enriched with peptides and maltodextrins at 80° C. under constant stirring and then cooled at room temperature, turned into gel, and then sized and packaged, having previously added optional colorants, flavors and preservatives or mixtures of them.

DETAILED DESCRIPTION OF THE INVENTION

The invention describes the elaboration of foodstuff in gel format produced from *quinoa* starch, enriched with peptides and maltodextrins obtained from partial protein and starch hydrolysis respectively from the same *quinoa* grains intended for consumption by sports practitioners during and after physical activity.

The use of protein *Chenopodium quinoa* for the development of nutrition and food sources has huge growth possibilities. That is why different methods for protein extraction from *quinoa* have been described. Aluko and Monu (Aluko, R E and Monu, E, Functional and Bioactive Properties of *Quinoa* Seed Protein Hydrolysates. *Journal of Food Science* 68:1254-1258 (2003)) detail one of the most widely used methodologies for protein extraction: extraction by alkaline solution, which for the purposes of the present invention was modified and optimized using experimental design, as described next. This extraction method is economic, easy to implement and to be industrialized. As a byproduct from protein extraction, starch is obtained which in turn can be enzymatically hydrolyzed to obtain maltodextrins and monosaccharides useful in the elaboration of new foodstuff.

The first step is to establish the granulometry of *quinoa* flour. *Quinoa* commercial flour has a size distribution that goes from 100 μm to 700 μm. We propose to work with granulometry between 100 and 300 μm, which represents 30% total weight of commercial *quinoa* flour. With bigger granulometry protein extraction becomes inefficient due to the reduction of the extraction surface, while the presence of protein in granulometry smaller than 100 μm is too low.

Flour in that size range is composed mainly by starch granules with low protein content.

In order to determine protein concentration in different extraction stages, proximate analysis were made to flour samples during different stages of the process, i.e. *quinoa* without lipids, *quinoa* without proteins and *quinoa* without lipids or proteins. The same analysis was also made to *Ecuadorian quinoa* grains taking information given by the United States Department of Agriculture (USDA) as reference. Those analyzes were conducted following the methodology proposed by the Association of Official Analytical Chemist (AOAC, Official Methods of Analysis of AOAC International. 16th ed. Washington, D.C. (1995)). Moisture content (drying in an oven at 105° C. for 24 hours), as well as protein (Kjeldahl method*5.7), ash (calcination in muffle at 550° C.) and fat (Soxhlet extraction) was determined in all different samples. Non-nitrogenous extractives (NNE), which correspond to total carbohydrates were determined by difference. The results, expressed in g/100 g of the sample are shown in Table I. The proximate analysis of different *quinoa* flour samples show that the obtained values in each of the analysis are within previously reported ranges, using proximate composition of a raw Ecuadorian grain and the information described in the USDA row in Table I as pattern. In the case of flour without proteins and flour without lipids or proteins, the increase in moisture content is the result of these components extraction.

The experimental design that was used corresponded to a 2 level factorial design, considering three replicates in the central point. Therefore, the design corresponded to a number 2 (Ruales, J and Nair, B, Nutritional quality of the protein in *quinoa* (*Chenopodium quinoa*, Willd) seeds. *Plant Foods for Human Nutrition* (*Formerly Qualitas Plantarum*) 42:1-11 (1992)), which generated a total of 19 experiment series in which the optimal conditions for lipid and/or protein extraction were sought. For data analysis, the generation of mathematical models and response optimization, the Design Expert 6.0 software (Stat-Ease Inc, Minneapolis, USA) was used. In the specific case of protein extraction, three factors were evaluated (extraction volume, NaOH concentration and extraction time), which were replicated in flour with 100 μm to 300 μm granulometry, with or without lipids.

Figure 1:
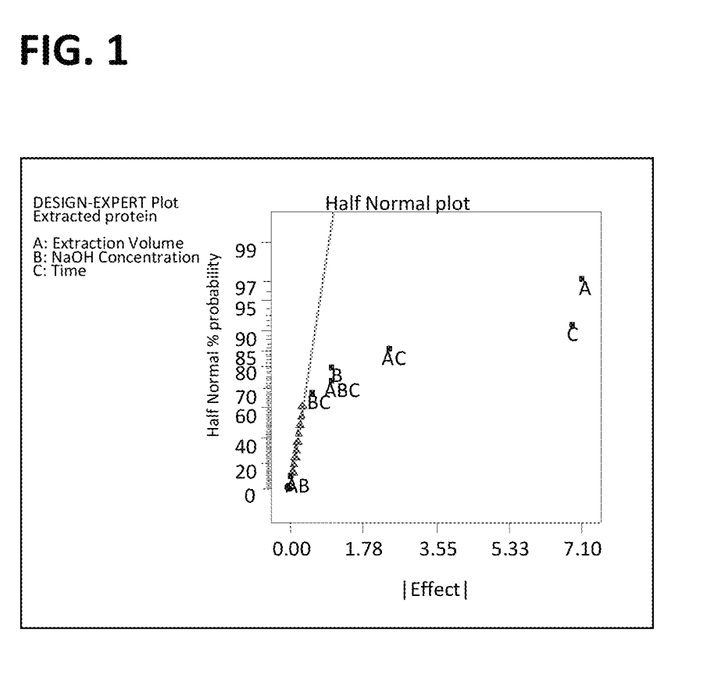
FIG. 1. Normal Probability Chart for the experimental design used in the development of the current project, which allows to observe the significance of the studied factors.

To optimize the responses, statistical significance of these effects was evaluated, individually or combined. Results showed that the combined effect between extraction volume and NaOH concentration, as well as the combined effect of NaOH concentration and time, were statistically significant as stated in FIG. 1.

TABLE I

Proximate analysis of quinoa flour samples.

| Samples | Moisture, % (bh) | Proteins (N*5,7), % (bs) | Ash, % (bs) | Fat, % (bs) | NNE (total carbohydrates), % (bs) |
|---|---|---|---|---|---|
| Quinoa flour (100-300 μm) Total | 9.7 | 12.41 | 2.1 | 8.19 | 77.3 |
| Quinoa flour (without lipids) | 9.3 | 11.57 | 2.09 | 1.87 | 84.47 |
| Quinoa flour (without lipids, without proteins) | 7.6 | 5.99 | 2.82 | 0.7 | 90.49 |
| Quinoa flour (with lipids, without) | 68.3 | 3.16 | 2.52 | 2.52 | 91.8 |
| Raw quinoa (Ecuadorian grain)* | 9.6 | 16.81 | 3.65 | 7.96 | 71.58 |
| Quinoa (USDA chart grain)* | 9.3 | 14.4 | 3.2 | 6.39 | 76.01 |

*Referential flour

Figure 2:
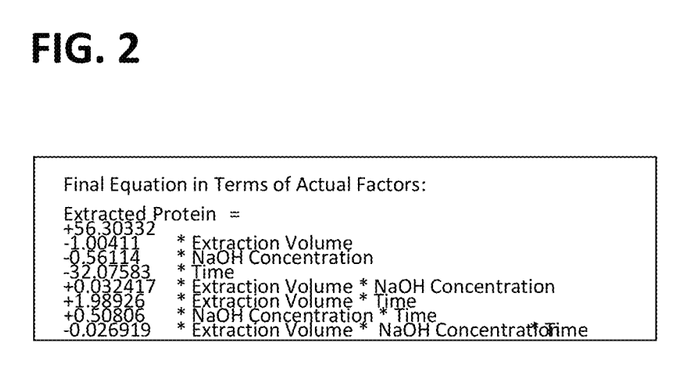
FIG. 2. Optimization polynomial for protein extraction.

A mathematical model representative of the effect of significant factors was generated in order to optimize the response, which in this case is the amount of extracted protein from *quinoa* flour, using the optimal values that each of the analyzed factors should have. The statistically significant polynomial ($p<0,0001$) that the optimal result gave is shown in FIG. 2, and was obtained from Design Expert software.

Figure 3:
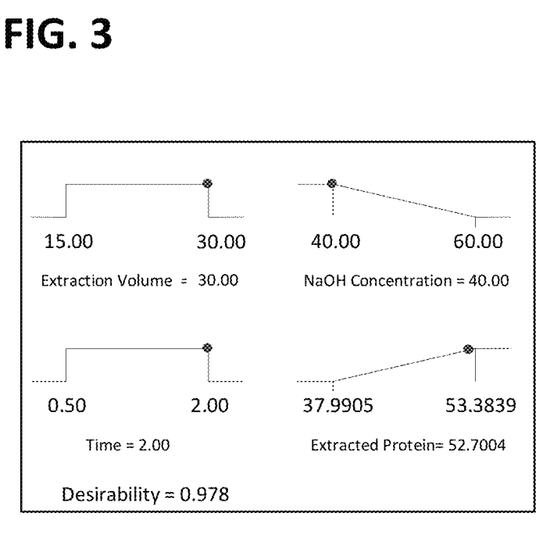
FIG. 3. Optimal values for each of the studied factors in *quinoa* protein extraction.

From this model it was possible to determine the optimal values for each evaluated factor, which, for the specific case of protein extraction, were 30 mL of NaOH 40 mM per gram of flour in a two-hour extraction process (FIG. 3). The model turned to be significant at a configuration of a 95% confidence (p value<0.0001), with a "desirability" (adjustment parameter model) which turned to be 0.978 in a 0 to 1 scale (1=maximum adjustment).

Therefore, the extraction process was made using 30 mL of a NaOH 40 mM (pH 12.0) solution for each 1 gram of *quinoa* flour. This suspension is incubated with constant stirring at room temperature for 2 hours.

Once the extraction is completed, the suspension is centrifuged at 3.000 g for 5 min at 4° C. recovering the supernatant, which contains the soluble *quinoa* proteins at a concentration between 0.4% and 0.3% w/v, depending if flour with or without lipids was respectively used. This procedure allows obtaining up to an 82% of proteins in the flour. An optional stage is to repeat the protein extraction step on the centrifugation precipitate, which allows recovering an additional ~8%, thus reaching a 90% protein at the end of the process. Incorporating ionic or non-ionic detergents does not significantly affect extraction efficiency.

Having completed the centrifugation process it is necessary to concentrate the supernatant solution that contains the *quinoa* proteins, as a previous step to enzymatic hydrolysis. For that purpose there are a number of alternatives: i) carrying out a vacuum concentration so as to avoid protein functionality loss as a result of a denaturation associated to severe thermal treatments, which could affect the peptides properties, ii) applying a nanofiltering technique with pore size membranes <5 kDa, which allows separating and concentrating the proteins in the solution, or iii) isoelectrically precipitating the protein content by adjusting the pH to 3.0 to 4.0 with HCl. However, it must be said that by isoelectric precipitation only ~60% proteins are recovered, while the other 40% remains in the solution. Proximate analysis performed on the isoelectric precipitate revealed that that it is composed by 75% w/w protein, 2.3% w/w ash, 9.1% w/w lipid (when using flour with lipids) and 14% w/w other constituents (starch, sugar, fiber, etc). Still, the goal of the concentration stage is to reach a protein content of ~8% w/v in the solution.

Lipids in the *quinoa* flour used during the development of this research corresponded to an 8.2% of its dry weight (Chart I). An optional prior operation to protein extraction is to remove those lipids so they will not interfere with the final analysis and/or to obtain a more efficient protein extraction. Through experimental design the use of a solution of 95% ethanol in 2:1 volume/weight ratio (mL/g) regarding the amount of *quinoa* flour (p<0.05) was determined. At smaller volumes of ethanol the suspension becomes very viscous, making it difficult to keep it homogenous during the extraction. Once the ethanol volume has been added, the suspension is hermetically sealed in order to avoid solvent evaporation. Finally, the suspension is incubated under stirring at 30° C. for about 2 hours. Stirring is an important factor to optimize extraction. It must keep flour suspended and avoid decantation during the process. Once the extraction is completed the lipid-free flour is recovered by filtering and by washing it with 95% ethanol. The lipid-free flour is kept at 60° C. all night (>12 hours). This procedure allows extracting around 80% of lipids in the *quinoa* flour.

Figure 4:
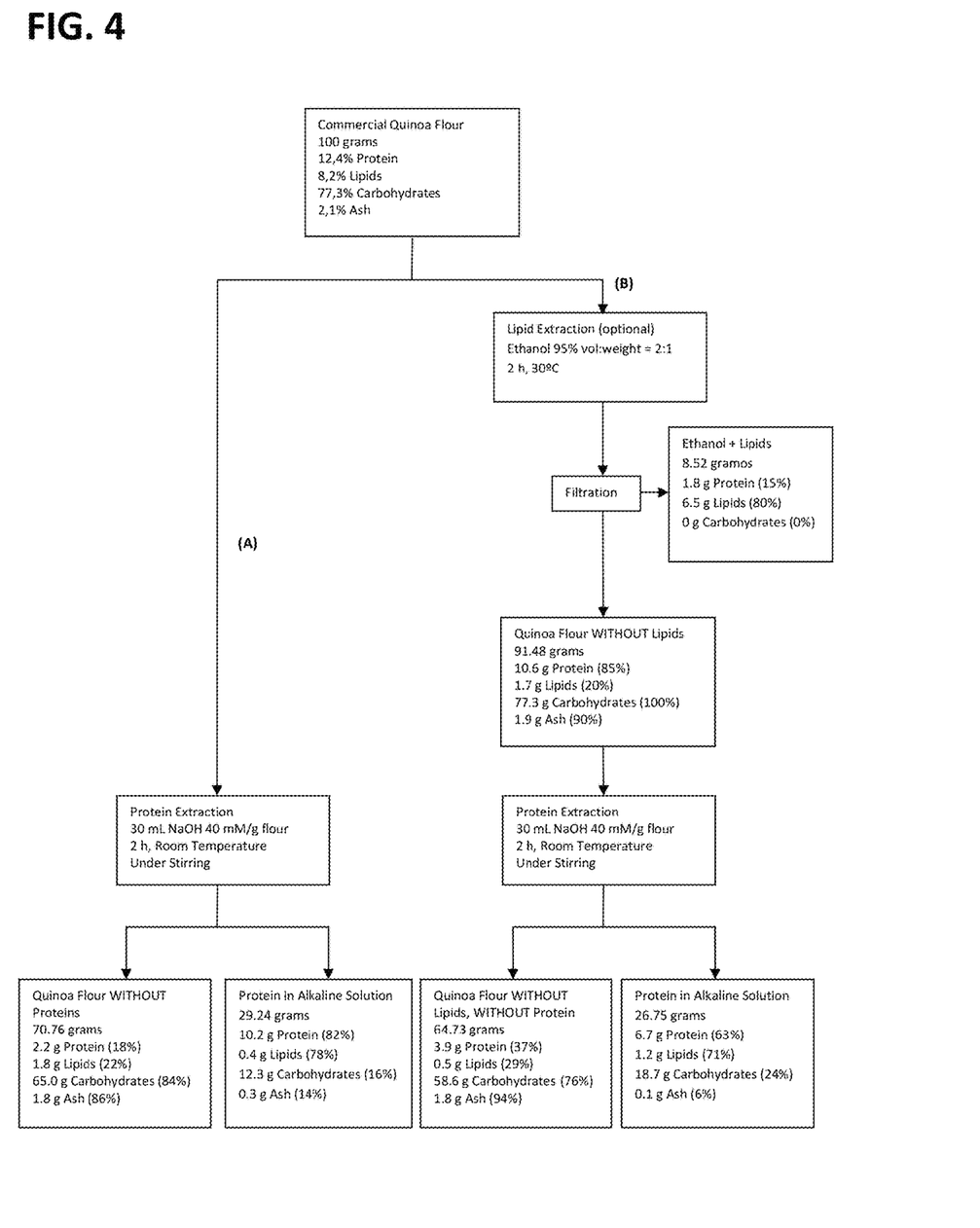
FIG. 4. Mass balance for products obtained at the end of the protein extraction process from *quinoa* flour. (A) Lipid extraction stage not considered, (B) Lipid extraction considered. The percentages correspond to the amount of constituent in each fraction, where the total amount of constituent equals 100%. Calculation base: 100 g commercial *quinoa* flour.
Figure 5:
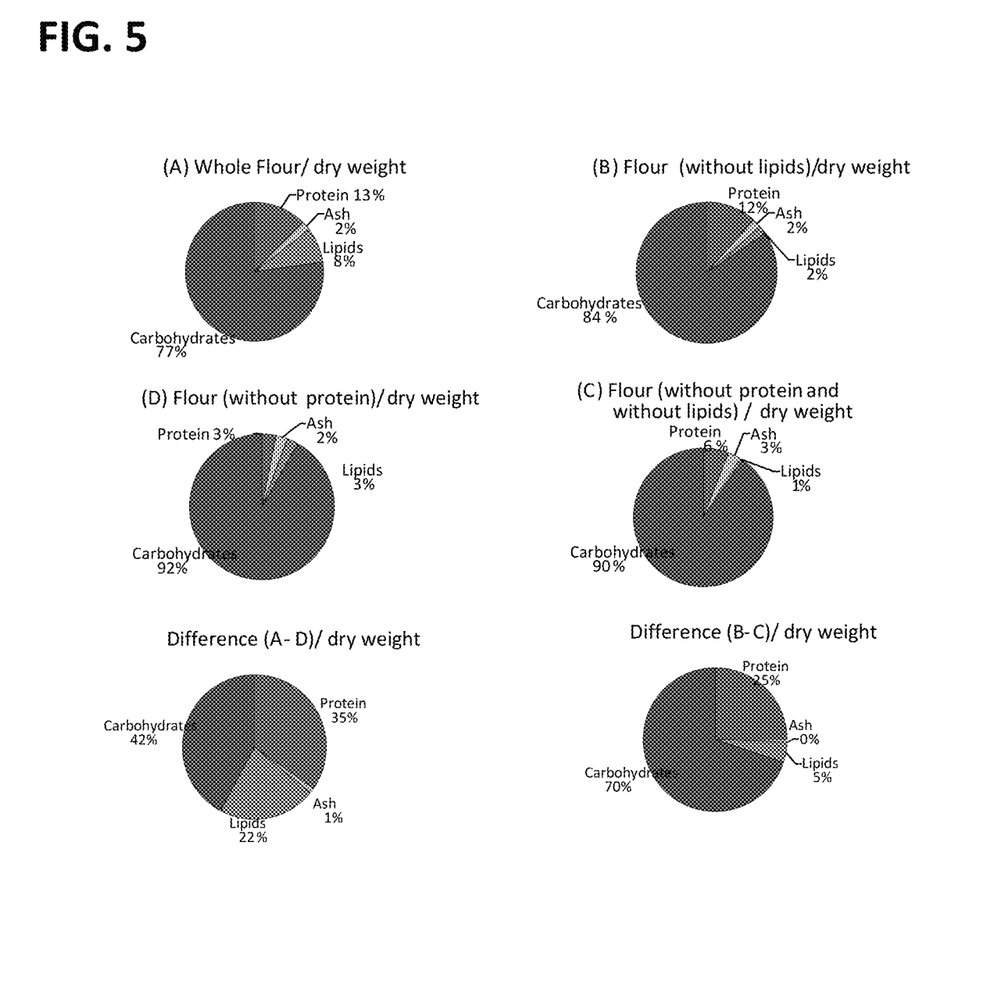
FIG. 5. Contents of protein, ash, fat and carbohydrates in whole flour (A) compared to lipid-free flour (B), protein and lipid-free flour (C), and protein-free flour(D).

Studies highlight the importance of extracting lipids as a stage prior to protein extraction. However, our research has shown that the efficiency of protein extraction increases significantly if this procedure is omitted (FIG. 4). The lipid extraction process drags with it hydrophobic proteins and lipoproteins that may represent up to a 15% of total proteins in *quinoa* seeds. As a consequence, in the remaining fraction after extraction with NaOH only ~63% of protein content in lipid-free flour is recovered. This represents ~20% less protein compared to the efficiency obtained from flour without previous lipid extraction (FIGS. 4 and 5). This result is very important concerning this invention, since it represents an essential difference to other methods of protein extraction described in previous studies. It is also of crucial importance regarding the ultimate goal of protein extraction, which is to obtain protein hydrolysates to be used in the elaboration of foodstuff. The absence of lipid extraction allows us to obtain *quinoa* peptides at higher levels. These peptides can then be incorporated in a gel for sportspeople in an innovative product formulation with unique functional and nutritional characteristics, and with a clear inventiveness level.

An aminoacid profiling performed on the *quinoa* protein concentrate (Table II), through high performance liquid chromatography (HPLC) coupled with UV detection allows to clearly observe the nutritional value of *quinoa* seed, since it is a good source of essential aminoacids such as Arginine (15.3 mg/100 g), Valine (7.4 mg/100 g), Leucine (7.1 mg/100 g), Lysine (6.6 mg/100 g) and sulfur amino acids such as Cysteine (5.5 mg/100 g) and Methionine (5.1 mg/100 g). It should also be considered the presence of other non essential aminoacids whose contribution continues to be significant, like glutamic acid (24.3 mg/100 g), aspartic acid (11.6 mg/100 g) and glycine (10.5 mg/100 g).

CHART II

| Aminoacid profile in quinoa protein concentrate. | | | |
|---|---|---|---|
| Amino acid | Concentration (mg/100 g) | Amino acid | Concentration (mg/100 g) |
| Asp | 11.6 | Tyr | 3.6 |
| Glu | 24.3 | Val | 7.4 |
| Ser | 6.1 | Met | 5.1 |
| Gly | 10.5 | Cys | 5.5 |
| His | 4.0 | Ileu | 3.3 |
| Arg | 15.3 | Leu | 7.1 |
| Thr | 4.4 | Phe | 4.7 |
| Ala | 7.8 | Lys | 6.6 |
| Pro | 9.6 | | |

To obtain peptides from proteins extracted from *quinoa* flour the protein suspension (~8% w/v) is heated at 80° C. for 5 min and then cooled at 55° C. keeping it for 1 min before adjusting the ph to 8.0 to 8.5 with NaOH or HCl, as appropriate. Then a 0.05 Alcalase Anson Unit (AU) per 1 g of total protein is added to the solution. The solution is incubated at 50 to 60° C. continuously controlling pH. When pH falls below 7.0 then 0.03 AU of a second commercial enzyme (Protamex, Neutrase or Flavourzyme) per 1 g of protein is added and the solution is incubated at 50° C. for 15 to 60 min. To stop the reaction the solution is heated again up to 85° C. for 15 min.

Figure 6:
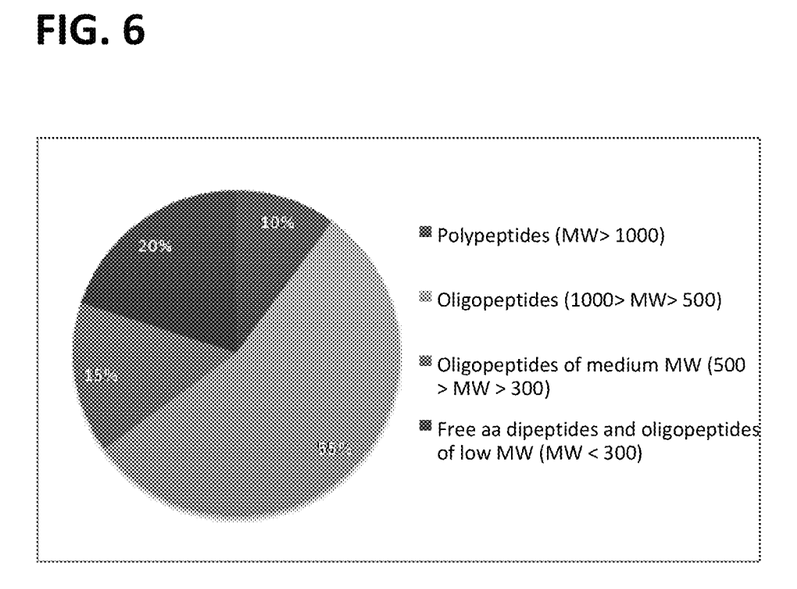
FIG. 6. Relative abundance diagram of peptides released during *quinoa* protein extract enzymatic digestion (MW: molecular weight, Da)

The degree of hydrolysis of the extracted and hydrolyzed protein through the aforementioned process, as well as the molecular weights of the obtained peptides was analyzed using Gel Permeation Chromatography (GPC) (FIG. 6). The results showed that the highest percentage of peptides is within the molecular weight ranging between 1000 and 500 Da.

Figure 7:
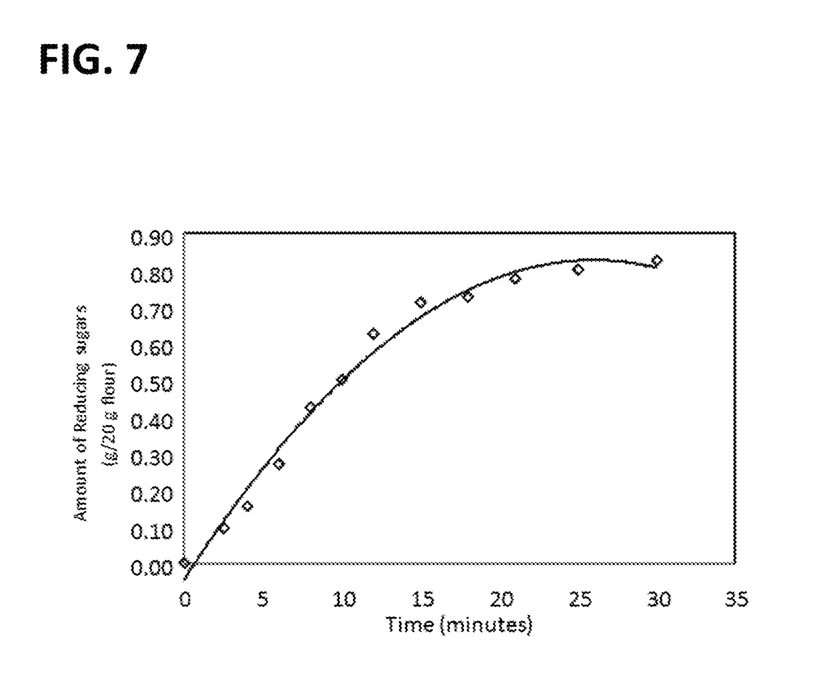
FIG. 7. Spectro-photometric measurement of reducing sugars released during *quinoa* starch hydrolysis.
Figure 8:
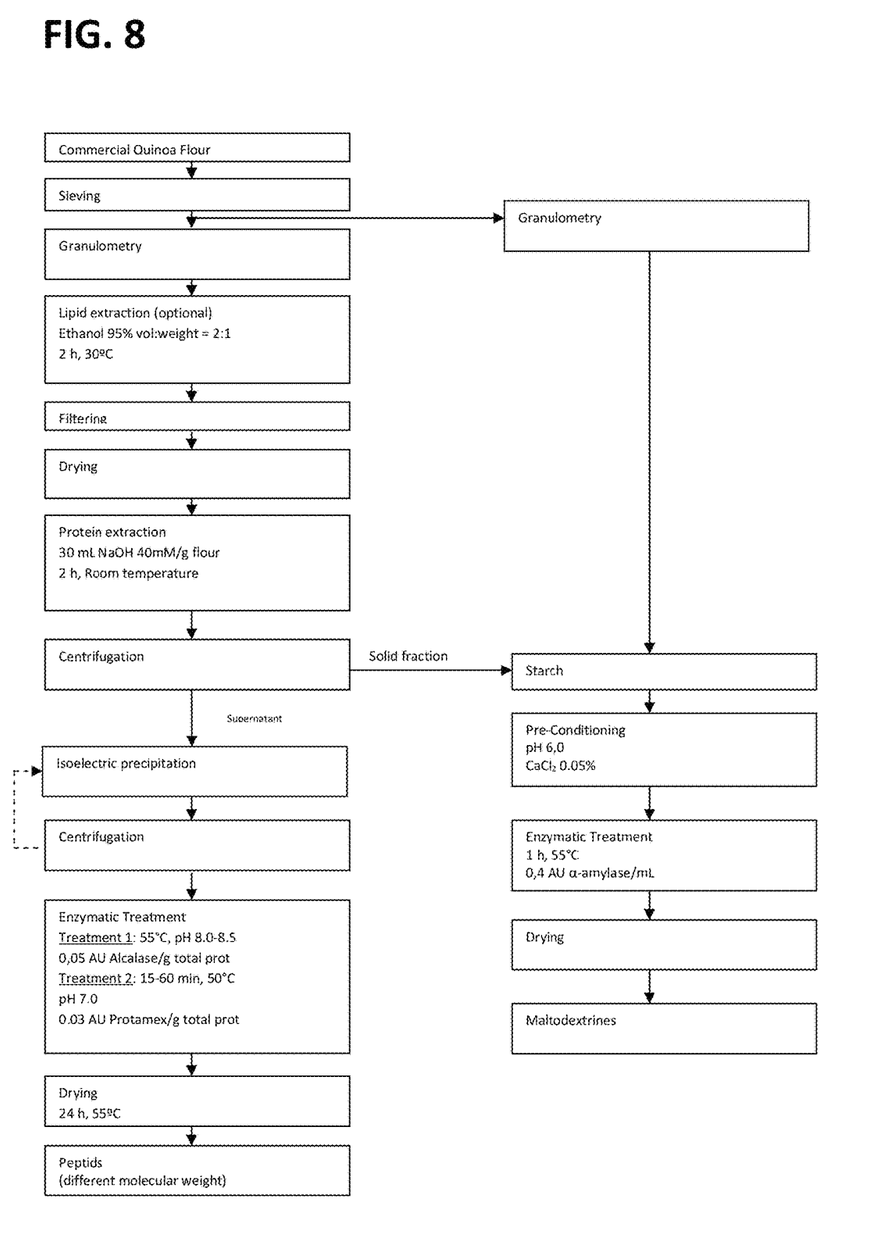
FIG. 8. Peptides and maltodextrins extraction from *quinoa* flour (flowchart).
Figure 9:
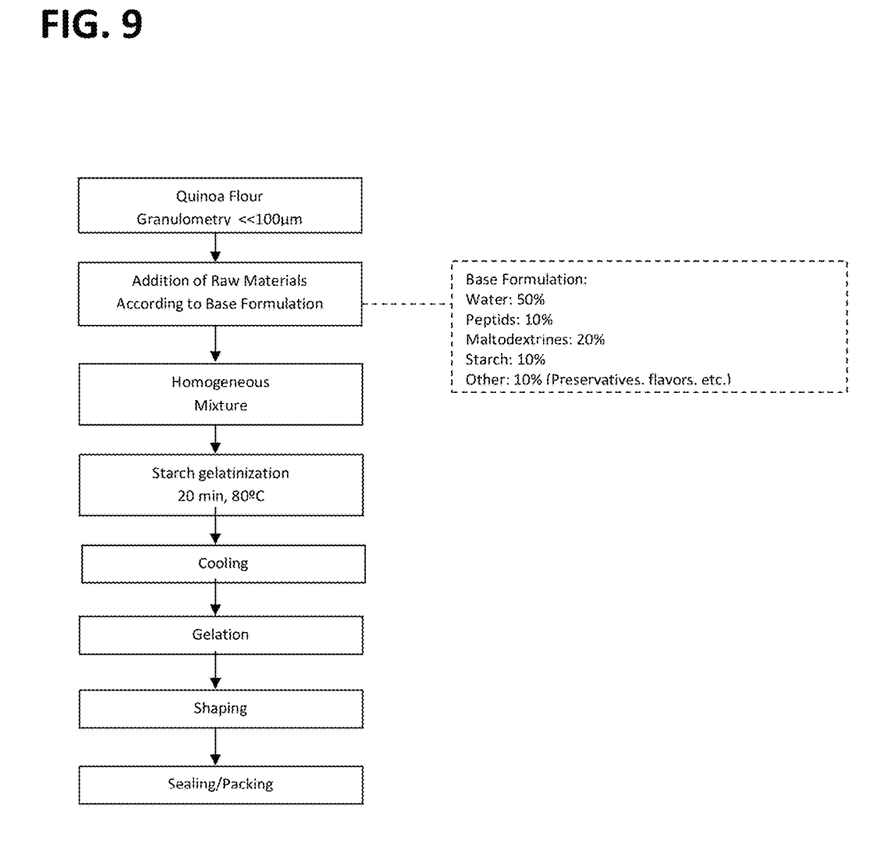
FIG. 9. Product formulation.

It is also possible to obtain maltodextrins from *quinoa* starch through enzymatic treatment. To do that 20 g of *quinoa* flour with <<100 μm granulometry are prepared. Then 100 mL water is added at room temperature. It is necessary to adjust pH to 6.0 in the solution and then add $CaCl_2$ at a concentration of 0.05%. Then add 0.4 U/ml of alpha-amylase enzyme. The initial solution is very viscous, but after adding the enzyme it starts to liquefy gradually, evidencing a decrease in the starch molecular weight. The temperature must be increased to 55° C. and then left in incubation for 1 hour under constant stirring. The reaction is stopped by heating the solution to 85° C. for 15 minutes. This stage is very important in order to turn starch into gel later. The amount of reducing sugars released during the process was measured using the Somogyi-Nelson method (Somogyi, M. 1952. Notes on sugar determination. Journal of Biological Chemistry 195: 19-23.). The results are shown in FIG. 7.

It has been observed that the reducing sugar content increases as the reaction time elapses. However, this behavior varies after 15 min reaction, when the hydrolyzing kinetics decreases. Thus, extending starch hydrolysis longer than 20 minutes has no significant effect on the reducing sugar content.

Starch Gel Preparation and Final Product Formulation

The base formulation for *quinoa* starch gel containing peptides and maltodextrins from the same source is detailed in Table II.

The necessary amount of *quinoa* flour is weighed (10%) with <<100 μm granulometry, which—as it has been mentioned—is formed mainly by starch. Then the necessary amount of peptides is added to a final 10% concentration and then the maltodextrins to a final 20% concentration. During this stage all the necessary colorants and flavors should be added in order to make the product more attractive. As a preservative, 1 g/kg sorbic acid is added, and then the necessary volume of distilled water. The resulting solution is heated at 80° C. for 20 min under constant stirring in order to turn the starch into gel. Once the desired consistency has been obtained the product is cooled at room temperature. When the mixture has turned into a viscous gel it can be sized in smaller fragments to finally seal it in a suitable packaging.

TABLE II

Base formulation for quinoa starch gel containing peptides and maltodextrins from the same source.

| Constituent | Content (% w/w) |
|---|---|
| Water | 50 |
| Peptides | 10 |
| Maltodextrins | 20 |
| Starch | 10 |
| Others (colorants, flavors, etc.) | 10 |

The invention claimed is:

1. A procedure for preparing a peptide and maltodextrin enriched gel foodstuff from quinoa starch, comprising the steps of:
    a) extracting protein from quinoa flour having a granulometry between 100-300 μm with 30 mL of sodium hydroxide 40 mM per gram of flour under constant stirring and at room temperature, wherein the sodium hydroxide is centrifuged maintaining in a supernatant 0.3-0.4% w/v of soluble protein;
    b) recovering proteins by isoelectric precipitation and further centrifugation and then performing an enzymatic treatment comprising the performance of two or more sequential enzymatic hydrolysis of the protein concentrate resulting from the isoelectric precipitation and drying the recovered proteins, wherein the first enzymatic hydrolysis of the extracting step a) comprises incubating with alkalase at a temperature higher than room temperature to achieve pH 8.0-8.5, the second enzymatic hydrolysis comprises an enzymatic hydrolysis with protease having a temperature higher than room temperature and pH 7; and the temperature higher than room temperature ranges from 50° C. to 60° C., to obtain an amount of 12.4% of peptides, wherein 55% of the peptides as obtained have a molecular weight (MW) ranging 0.5-1 kDa while 35% of the peptides as obtained have a MW lower than 0.5 kDa;
    c) extracting maltodextrin from quinoa flour having a granulometry <<100 μm and a solid fraction from precipitate obtained from step a), including starch, by adjusting the solution to a slightly acidic pH and admixing $CaCl_2$ and performing an enzymatic hydrolysis and obtaining maltodextrins to perform a step of drying after the enzymatic treatment; and
    d) creating a homogeneous mixture by combining the solution of quinoa flour having ganulometry <<100μm, which is mainly constituted by starch with the soluble protein obtained from the step of extraction a) and maltodextrins obtained from the step of extraction c) adding optionally, colorants, flavors and preservatives to subsequently adding water and heating under constant stirring with the objective of gelatinizing the mixture of starch of quinoa enriched in peptides and maltodextrines and once achieved the desired consistency it is cooled at room temperature.

2. The procedure according to claim 1, wherein in step a), the centrifuging is performed at a temperature of 4° C.

3. The procedure according to claim 1, wherein in step b) the isoelectric precipitation is made at a pH of between 3.0 and 4.0.

4. The procedure according to claim 1, wherein in step c) the pH of the solution is adjusted to pH 6.0.

5. The procedure according to claim 1, wherein in step c) the temperature is 50° C.

6. The procedure according to claim 1, wherein the enzymatic hydrolysis to the extraction step c) comprises the use of alpha-amylase at a temperature higher than room temperature.

7. The procedure according to claim 6, wherein the temperature is 55° C.

8. The procedure according to claim 1, wherein in step d) the homogenous mixing has up to 50% water, up to 10% starch, up to 10% peptide and up to 10% maltodextrins.

* * * * *